US008448066B2

(12) United States Patent
Hasuike

(10) Patent No.: US 8,448,066 B2
(45) Date of Patent: May 21, 2013

(54) DOCUMENT EDITING DEVICE, DOCUMENT EDITING METHOD AND COMPUTER READABLE MEDIUM

(75) Inventor: Kimitake Hasuike, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 345 days.

(21) Appl. No.: 12/545,516

(22) Filed: Aug. 21, 2009

(65) Prior Publication Data

US 2010/0235728 A1    Sep. 16, 2010

(30) Foreign Application Priority Data

Mar. 10, 2009  (JP) .................................. 2009-056608

(51) Int. Cl.
G06F 17/00  (2006.01)
(52) U.S. Cl.
USPC ........................................................ 715/274
(58) Field of Classification Search
USPC .................................. 715/251, 255, 273, 274
See application file for complete search history.

(56) References Cited

U.S. PATENT DOCUMENTS

| | | | | |
|---|---|---|---|---|
| 4,951,233 A | * | 8/1990 | Fujiwara et al. | 715/209 |
| 6,081,817 A | * | 6/2000 | Taguchi | 715/234 |
| 6,139,201 A | * | 10/2000 | Carbonell et al. | 704/2 |
| 6,917,921 B1 | * | 7/2005 | Cimral et al. | 705/7.11 |
| 7,523,385 B2 | * | 4/2009 | Nguyen et al. | 715/200 |
| 7,639,387 B2 | * | 12/2009 | Hull et al. | 358/1.18 |
| 2002/0111946 A1 | * | 8/2002 | Fallon | 707/9 |
| 2002/0138582 A1 | * | 9/2002 | Chandra et al. | 709/206 |
| 2008/0147661 A1 | * | 6/2008 | Carden | 707/7 |
| 2008/0270930 A1 | * | 10/2008 | Slosar | 715/776 |
| 2008/0300982 A1 | * | 12/2008 | Larson et al. | 705/14 |
| 2009/0150769 A1 | * | 6/2009 | Konnola et al. | 715/251 |
| 2009/0172005 A1 | * | 7/2009 | LaToza et al. | 707/102 |
| 2009/0319946 A1 | * | 12/2009 | Boyer et al. | 715/810 |
| 2010/0037151 A1 | * | 2/2010 | Ackerman et al. | 715/753 |
| 2010/0211515 A1 | * | 8/2010 | Woodings et al. | 705/320 |

FOREIGN PATENT DOCUMENTS

| | | |
|---|---|---|
| JP | A-11-259458 | 9/1999 |
| JP | A-2006-005670 | 1/2006 |
| JP | A-2006-279535 | 10/2006 |

OTHER PUBLICATIONS

Mar. 19, 2013 Office Action issued in Japanese Patent Application No. 2009-056608 (with translation).

* cited by examiner

Primary Examiner — Laurie Ries
(74) Attorney, Agent, or Firm — Oliff & Berridge, PLC

(57) ABSTRACT

A document editing device includes: a storage section that stores document information partitioned in plural pages and page designating information which designates a page to be used of the plural pages of the document information so as to be correlated with the document information and a purpose; a page designating information selecting section that selects the page to be used from the page designating information according to the document information and purpose designated; and a document editing section that extracts document information of the page to be used from the document information designated according to the page to be used selected. Further, the document editing section edits the document information as edited document information.

5 Claims, 7 Drawing Sheets

DOCUMENT EDITING DEVICE, DOCUMENT EDITING METHOD AND COMPUTER READABLE MEDIUM

CROSS-REFERENCE TO RELATED APPLICATIONS

This application is based on and claims priority under 35 USC 119 from Japanese Patent Application No. 2009-056608 filed on Mar. 10, 2009.

BACKGROUND

1. Technical Field

This invention relates to a document editing device, a document editing method and a computer readable medium.

2. Related Art

Document editing devices which change a document to be used according to progress of a meeting are proposed.

SUMMARY

According to an aspect of the invention, a document editing device includes: a storage section that stores document information partitioned in plural pages and page designating information which designates a page to be used of the plural pages of the document information so as to be correlated with the document information and a purpose; a page designating information selecting section that selects the page to be used from the page designating information according to the document information and purpose designated; and a document editing section that extracts document information of the page to be used from the document information designated according to the page to be used selected, and that edits the document information as edited document information.

BRIEF DESCRIPTION OF THE DRAWINGS

Exemplary embodiments of the present invention will be described in detail based on the following figures, wherein.

DETAILED DESCRIPTION (Configuration of Document Editing System)

Figure 1:
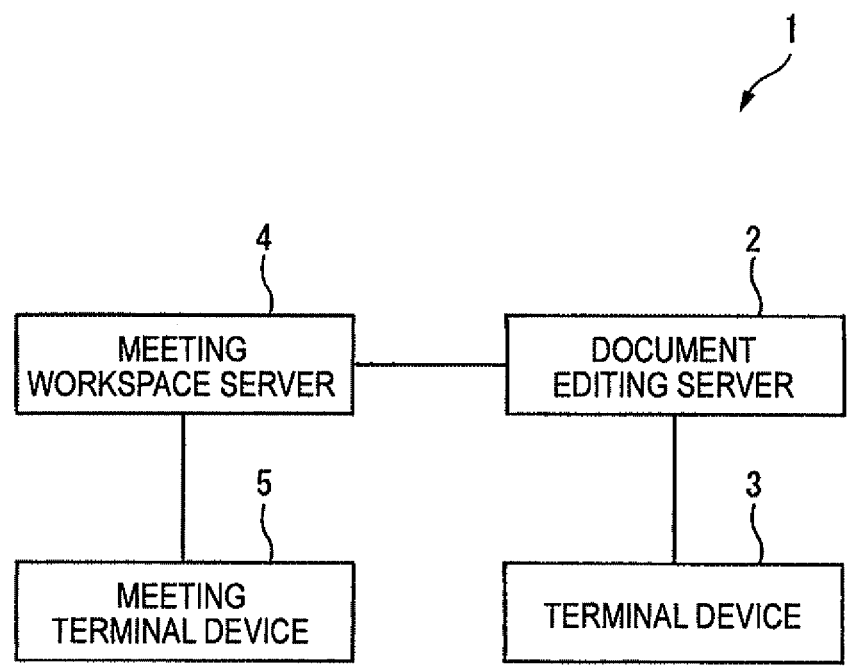
FIG. 1 is a schematic view showing a constructive example of a document editing system according to an exemplary embodiment of this invention.

FIG. 1 is a schematic view showing a constructive example of a document editing system according to an exemplary embodiment of this invention.

A document editing system 1 includes a document editing server 2 which stores document information and extracts a page desired by a user from the document information to edit the document information; a terminal device 3 which creates document information using presentation software and word-processor software according to a user's manipulation and uploads the document information created in the document editing server 2; a meeting workspace server 4 which downloads the document information edited by the document editing server 2 according to the user's manipulation and stores it; and a meeting terminal device 5 which displays the document information uploaded in the meeting workspace server 4 on a display unit not shown. There may be provided plural terminal devices 3 and of meeting terminal devices 5; for example the meeting terminals devices 5 are set up for the corresponding meeting rooms for the use of presentation.

Figure 2:
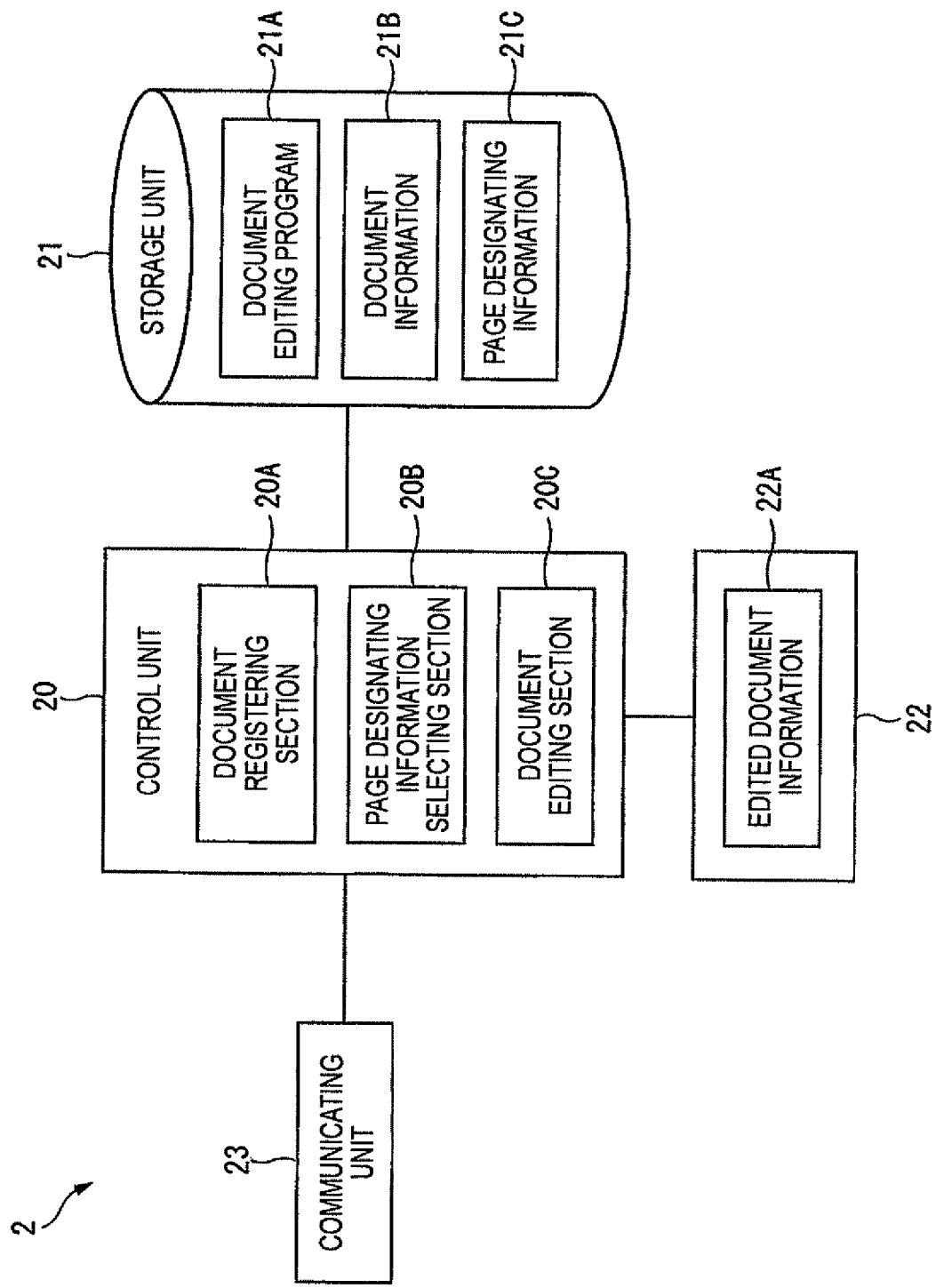
FIG. 2 is a schematic view of a constructive example of a document editing server according to an exemplary embodiment of this invention.

FIG. 2 is a schematic view of a constructive example of a document editing server according to an exemplary embodiment of this invention.

The document editing server 2 is constructed of a CPU (Central Processing Unit) including a control unit 20 which controls the respective parts and executes various kinds of programs; a storage unit 21 which is constructed of a storage device such as an HDD (Hard Disc Drive) to store information; a memory 22 which is constructed of a volatile memory to temporarily store information; and a communicating unit 23 for communicating with the outside.

The control unit 20 executes a document editing program 21A described later to operate a document registering section 20A, a page designating information selecting section 20B and a document editing section 20C.

The document registering section 20A is a means for registering, in the storage unit 21, the document information uploaded from the terminal device 3 and the page designating information, i.e. information designating the page used for each purpose for the document information. The page designating information selecting section 20B is a means for selecting the designated page corresponding to a purpose when the page is designated from the page designating information by a user. The document editing section 20C is a means for extracting a designated page selected from the document information by the page designating information selecting section 20B to edit the document information.

The storage unit 21 includes the document editing program 21A for causing the control unit 20 to operate as each means described above; document information 21B exhibiting the information uploaded from the terminal device 3 and registered by the document registering section 20A; and the page designating information 21C designated according to a user's manipulation at the terminal device 3 and exhibiting the information designating the page to be used for each document information and purpose.

The memory 22 temporarily stores edited document information 22A, which is created by extracting the page to be used from the document information 21B and editing it by the document editing section 20C.

Figure 3:
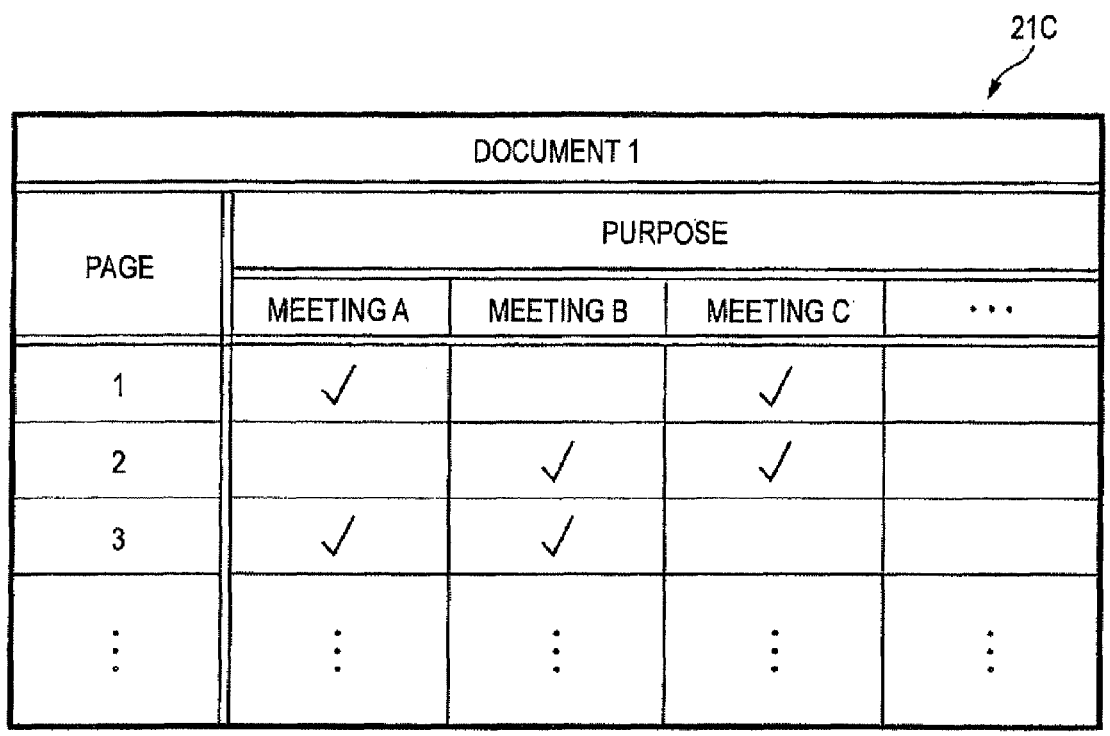
FIG. 3 is a schematic view of a constructive example of page designating information according to an exemplary embodiment of this invention.

FIG. 3 is a schematic view showing a constructive example of page designating according to an exemplary embodiment of this invention.

The page designating information 21C is page designating information provided for each document information, which includes a "page" indicating respective pages of "document 1"; a "purpose" indicating e.g. the kind of a meeting; and checking marks for designating the pages used for the respective purposes. For example, the pages are designated to use, for example, "pages" 1 and 3 of "document 1" in "meeting A"; "pages" 2 and 3 of "document 1" in "meeting B" and "pages" 1 and 2 of "document 1" in "meeting C".

Not the configuration designating the pages to be used, but a configuration designating the pages to be not used may be adopted.

(Operation)

Hereinafter, referring to the respective drawings, an explanation will be given of the operation of a document editing system according to an exemplary embodiment of this invention.

Figure 4:
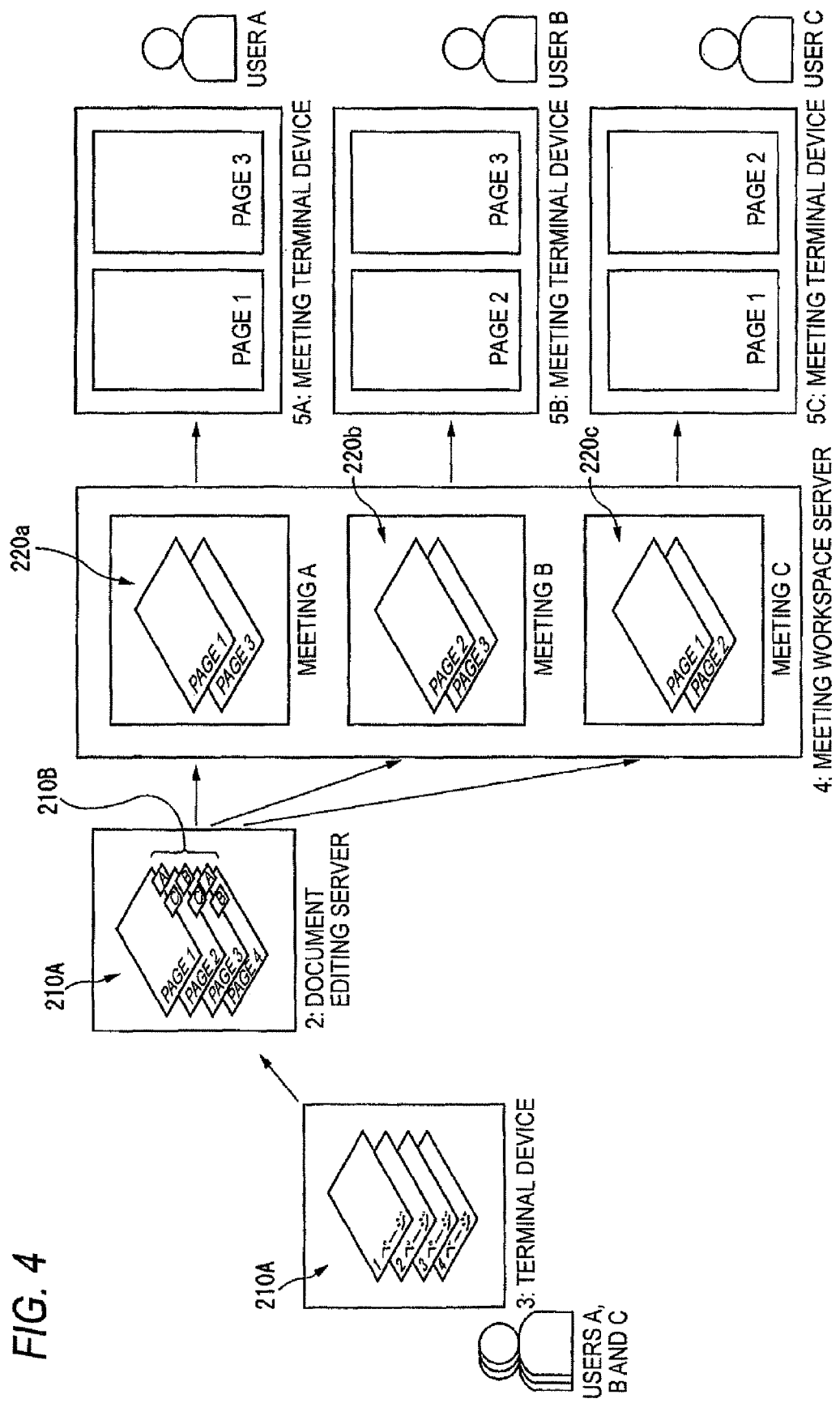
FIG. 4 is a schematic view of an operation example of a document editing system according to an exemplary embodiment of this invention.

FIG. 4 is a schematic view of an operation example of a document editing system according to an exemplary embodiment of this invention.

First, for example, user A accesses the document editing server 2 at the terminal device 3, and uploads created document information 210A into the document editing server 2. Next, users A, B and C designate the pages to be used of the document information 210A in the document editing server 2, and create page designating information B, respectively at the terminal device 3.

Next, when the meeting workspace server 4 receives a downloading request of the document information through meeting terminal devices 5A, 5B and 5C from the users A, B and C, respectively, it confirms the purpose and document information desired by the users and requires the document editing server 2 to upload the pertinent edited document information.

When the document editing server 2 receives a desired purpose and document information, referring to the document information and page designating information, it creates the edited document information from the document information 210A and uploads it, into the meeting workspace server 4, as edited document information 220a, 220b and 220c corresponding to the purpose "meeting A", "meeting B" and "meeting C".

Next, the meeting workspace server 4 downloads the edited document information 220a, 220b and 220c at the meeting terminal devices 5A, 5B and 5C, respectively, which will be used in the respective meeting terminal devices 5A, 5B and 5C.

The operation described above is executed, for example, when the user participating in each meeting requests downloading of the edited document information at each meeting terminal device at the time when each meeting starts, but the edited document information may be previously created. Further, the document registering section 20A, when it revises the document information 21B previously registered in the storage unit 21, revises the document information 21B while keeping correlation of the page designating information 21C with the document information 21B to be revised. Thus, by executing the above operation when downloading of the edited document information is requested, revision of the document information 21B is reflected on the edited document information.

Figure 5:
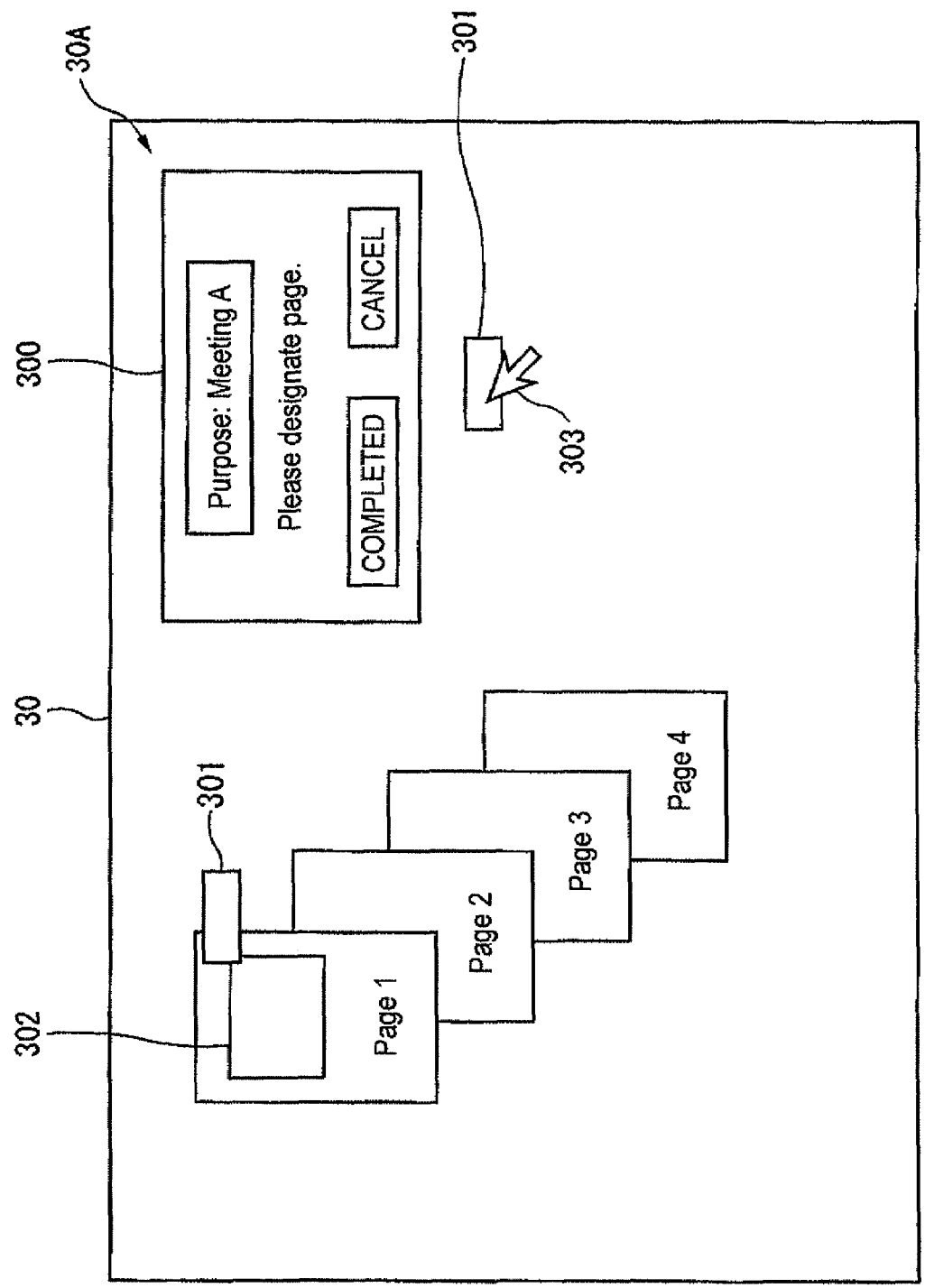
FIG. 5 is a schematic view of an operation example of a document editing server according to an exemplary embodiment of this invention.

FIG. 5 is a schematic view of an operation example of a document editing server according to an exemplary embodiment of this invention.

A page designation exhibition 30A is displayed on a display screen 30 of the terminal device 3 when the user creates the page designating information 210B in the document editing server 2 through the terminal device 3. The page designation exhibition 30A includes page designating information exhibition 300 for setting the purpose and also instructing completion or cancel of the operation; a page designating tag 301 for designating a page; a part designating frame 302 for designating a part of the page; and a cursor 303 which is moved according to a user's manipulation to manipulate the page designating tag 301.

It should be noted that a region other than the region selected by the part designating frame 302 within the page is not displayed in the edited document information.

Figure 6:
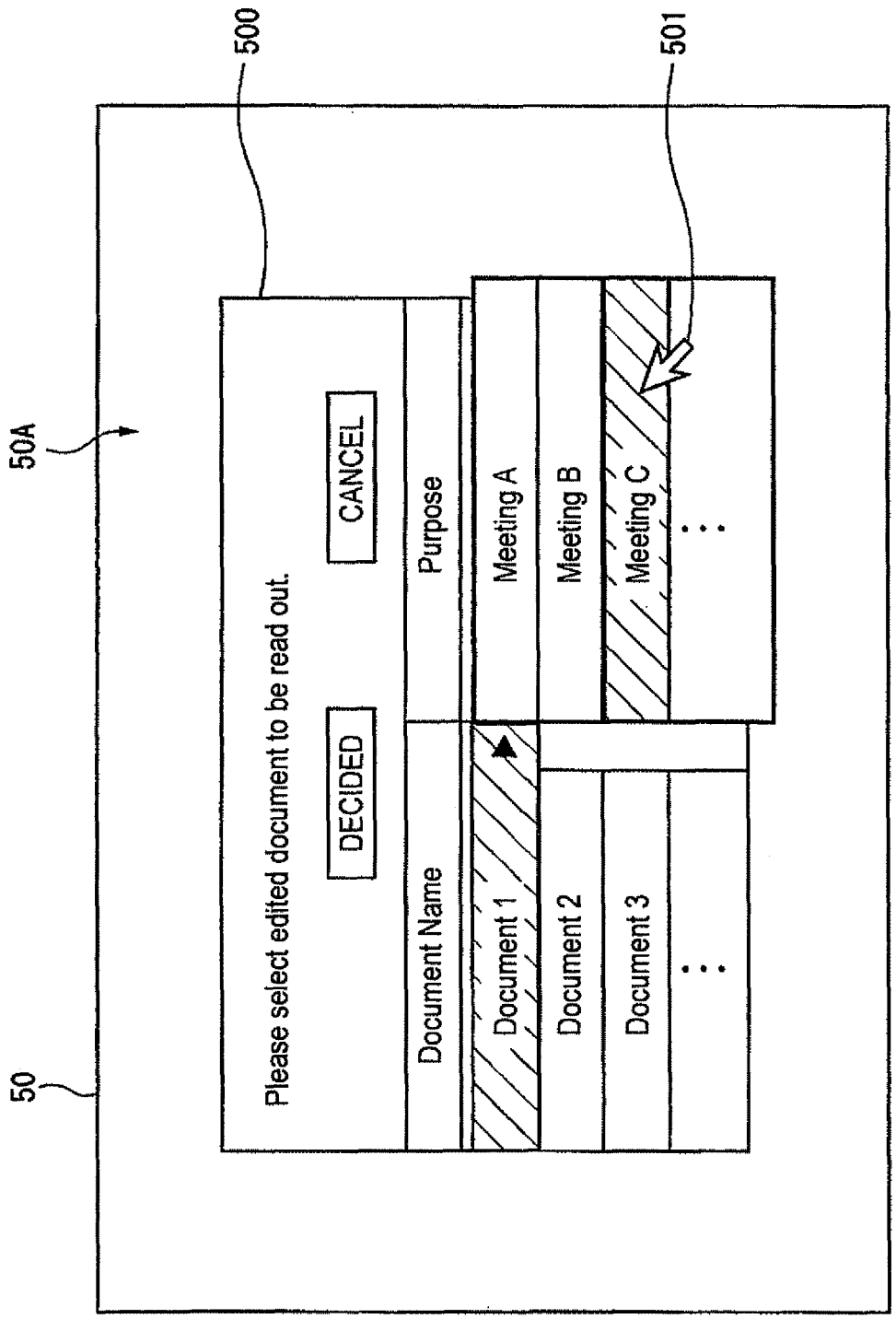
FIG. 6 is a schematic view of an operation example of a document editing server according to an exemplary embodiment of this invention.

FIG. 6 is a schematic view of an operation example of a document editing server according to an exemplary embodiment of this invention.

An edited document selecting exhibition 50A is displayed on a display screen 50 of the meeting terminal device 5 when the user selects a document and a purpose in the meeting workspace server 4 through the meeting terminal device 5. The edited document selecting exhibition 50A includes a page selecting information exhibition 500 for selecting the document information and the purpose for the document thus selected; and a cursor 501 used for a selecting operation.

Figure 7:
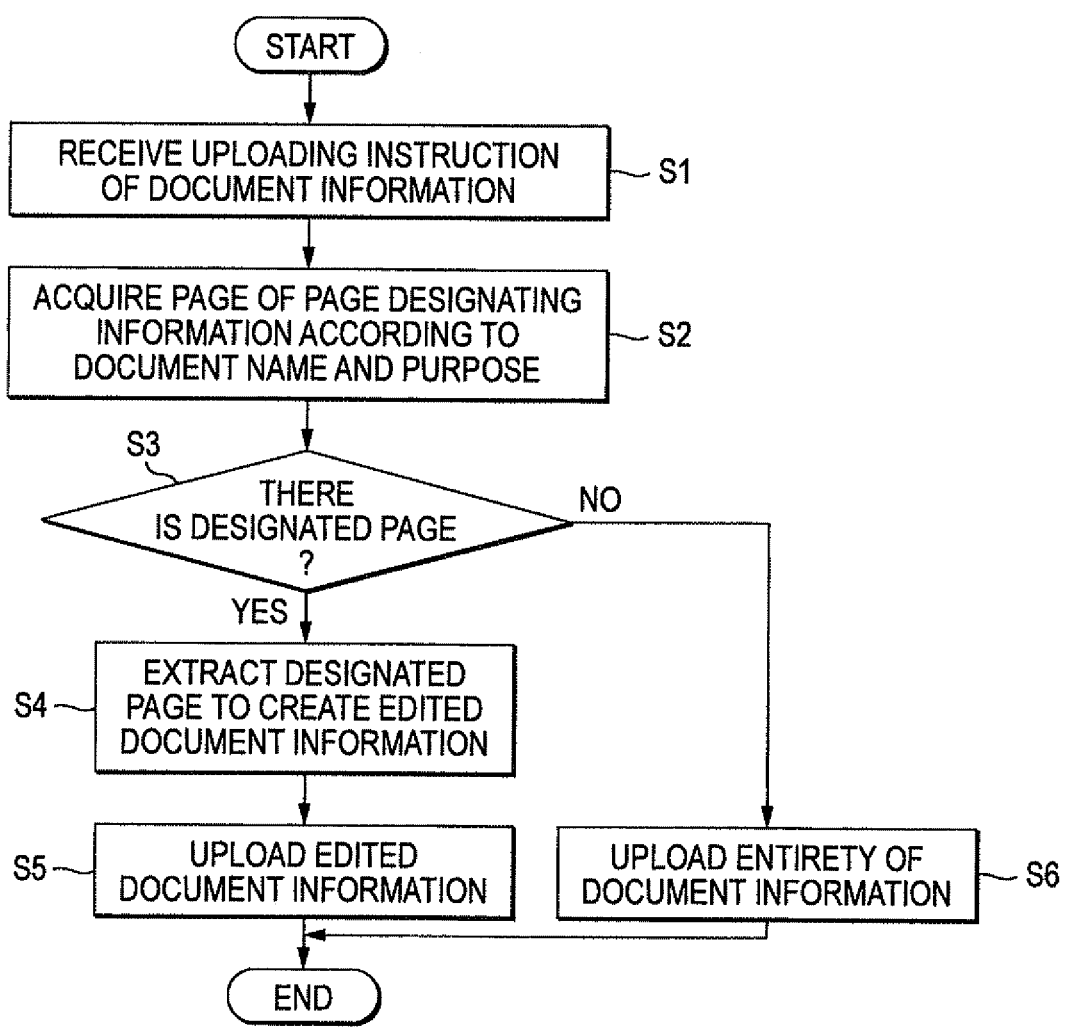
FIG. 7 is a flowchart showing an operation example of a document editing server according to an exemplary embodiment of this invention.

FIG. 7 is a flowchart showing an operation example of a document editing server according to an exemplary embodiment of this invention.

First, when the page designating information selecting section 20B in the document editing server 2 receives an uploading instruction of the edited document information from the meeting terminal device 5 through the meeting workspace server 4 (S1), it acquires a checked page from the page designating information 21C according to the document name and purpose selected in the meeting terminal device 5 (S2).

If there is the checked page (S3; Yes), the document editing section 20C edits the document information 21B in a manner of extracting the designated page from the document information 21B to create the edited document information 22A which is temporarily stored in the memory 22 (S4).

Next, the document editing section 20C uploads the edited document information 22A within the memory 22 into the meeting workspace server 4 through the communicating unit 23 (S5).

If there is not the checked page for the document name and purpose in the page designating information 21C (S3; No), the document editing section 20C uploads the entirety of the document information corresponding to the selected document name into the meeting workspace server 4 (S6).

[Another Exemplary Embodiment]

This invention should not be limited to the exemplary embodiment described above, but can be changed in various manners within a scope not departing from the spirit of this invention. For example, in place of the meeting workspace server 4 and meeting terminal device 5, a workspace server and a terminal device having another purpose may be provided. Further, the edited document information may be downloaded into the terminal device 3 from the document editing server 2.

Further, the document registering section 20A, page designating information selecting section 20B and document editing section 20C used in the above exemplary embodiments may be read into the storage unit in the document editing device from a storage medium such as CD-ROM, or may be downloaded into the storage unit of the document editing device from a server device connected to a network such as an internet. Further, a part or entirety of the section used in the above exemplary embodiments may be realized by hardware such as ASIC.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document editing device comprising:
a communication section that receives document information and page designating information from a user;
a storage section that stores the document information, from the user, partitioned in a plurality of pages and the page designating information, which designates a page to be used of the plurality of pages of the document information so as to be correlated with the document information and a purpose;
a page designating information selecting section that selects the page to be used from the page designating information according to the document information and purpose designated; and
a document editing section that extracts document information of the page to be used from the document information designated according to the page to be used selected, and that edits the document information as edited document information,
wherein the purpose includes a kind of meeting, and
when the document information is edited, the storage section keeps correlation of the page designating information with the edited document information.

2. The document editing device according to claim 1, wherein
the document editing section transmits the edited document information to a designating source having designated the document information.

3. The document editing device according to claim 1, wherein
the storage section stores in-page designating information which designates a part within the page as the page designating information; and
the document editing section extracts partial information within the document information of the page to be used from the document information according to the in-page designating information and edits the edited document information.

4. A document editing method comprising:
receiving document information and page designating information from a user;
storing the document information, from the user, partitioned in a plurality of pages and the page designating information, which designates a page to be used of the plurality of pages of the document information so as to be correlated with the document information and a purpose;
selecting the page to be used from the page designating information according to the document information and purpose designated;
extracting document information of the page to be used from the document information designated according to the selected page to be used; and
editing the document information as edited document information,
wherein the purpose includes a kind of meeting, and
when the document information is edited, the storage section keeps correlation of the page designating information with the edited document information.

5. A computer readable medium storing a program causing a computer which is capable of referring to document information partitioned in a plurality of pages, and page designating information which designates a page to be used of the plurality of pages of the document information so as to be correlated with the document information and a purpose, to execute a process for editing a document,
the process comprising:
receiving document information and page designating information from a user;
storing the document information, from the user, partitioned in a plurality of pages and the page designating information, which designates a page to be used of the plurality of pages of the document information so as to be correlated with the document information and a purpose;
selecting the page to be used from the page designating information according to the document information and purpose designated;
extracting document information of the page to be used from the document information designated according to the selected page to be used; and
editing the document information as edited document information,
wherein the purpose includes a kind of meeting, and
when the document information is edited, the storage section keeps correlation of the page designating information with the edited document information.

* * * * *